United States Patent
Schenk et al.

(10) Patent No.: US 10,118,440 B1
(45) Date of Patent: Nov. 6, 2018

(54) SUSPENSION CASTER WITH BRAKE LEVER AND WHEEL FORK AND YOKE PORTION HAVING COMMON PIVOT AXIS

(71) Applicant: Colson Caster Group, LLC, Oakbrook Terrace, IL (US)

(72) Inventors: Charles Schenk, Edwardsburg, MI (US); Michael Freshour, II, Edwardsburg, MI (US)

(73) Assignee: COLSON CASTER GROUP, LLC, Oakbrook Terrace, IL (US)

( * ) Notice: Subject to any disclaimer, the term of this patent is extended or adjusted under 35 U.S.C. 154(b) by 0 days.

(21) Appl. No.: 15/619,647

(22) Filed: Jun. 12, 2017

(51) Int. Cl.
    *B60B 33/00* (2006.01)

(52) U.S. Cl.
    CPC ...... *B60B 33/0081* (2013.01); *B60B 33/0078* (2013.01); *B60B 33/006* (2013.01); *B60B 33/0047* (2013.01); *Y10T 16/195* (2015.01)

(58) Field of Classification Search
    CPC ... B60B 33/045; B60B 33/0042; B60B 33/04; B60B 33/06; B60B 33/063; B60B 33/066; B60B 33/0078; B60B 33/0081; Y10T 16/195
    See application file for complete search history.

(56) References Cited

U.S. PATENT DOCUMENTS

| | | | | |
|---|---|---|---|---|
| 1,733,536 A | | 10/1929 | Guitschula | |
| 2,096,229 A | * | 10/1937 | Dudley | B60B 33/021 16/35 R |
| 2,345,442 A | * | 3/1944 | Winter | B60B 33/021 16/35 R |
| 2,738,542 A | * | 3/1956 | Clark, Jr. | B60B 33/045 16/44 |
| 2,885,720 A | * | 5/1959 | Seeberger | B60B 33/021 16/35 R |
| 2,942,290 A | * | 6/1960 | Segal | B60B 33/021 16/35 R |
| 4,077,087 A | * | 3/1978 | Mooney | B60B 33/021 16/35 R |
| 4,336,629 A | * | 6/1982 | Jarvis, Jr. | B60B 33/0078 16/35 R |
| 4,346,498 A | | 8/1982 | Welsch et al. | |
| 4,414,702 A | * | 11/1983 | Neumann | B60B 33/021 16/35 R |
| 4,462,138 A | | 7/1984 | Black | |
| 4,731,899 A | * | 3/1988 | Huang | B60B 33/02 16/344 |
| 4,763,910 A | * | 8/1988 | Brandli | B60B 33/0042 16/44 |

(Continued)

*Primary Examiner* — Jeffrey O'Brien
(74) *Attorney, Agent, or Firm* — Thompson Coburn LLP

(57) ABSTRACT

A caster has a yoke portion and wheel forks pivotally connected to the yoke portion at a pivot connection. The pivot connection defines a pivot axis. A wheel is rotatably connected to the wheel fork at a wheel axis. A brake lever is operatively connected to the pivot connection to pivot about the pivot axis. The brake lever moves a brake pad between an engaged position and a disengaged position as the brake lever is pivoted about the pivot axis. In the engaged position, brake pad is pressed against the wheel with a cam operatively connected to the brake lever, and wherein the disengaged position, the cam cooperates with the brake pad in a manner such that the brake pad releases from the wheel.

18 Claims, 6 Drawing Sheets

(56) References Cited

U.S. PATENT DOCUMENTS

| | | | |
|---|---|---|---|
| 4,815,161 A * | 3/1989 | Timmer | B60B 33/021 |
| | | | 16/35 R |
| 4,835,815 A * | 6/1989 | Mellwig | B60B 33/0078 |
| | | | 16/35 R |
| 5,400,469 A * | 3/1995 | Simonsen | B60B 33/045 |
| | | | 16/20 |
| 5,802,668 A * | 9/1998 | Gosselin | B60B 33/0039 |
| | | | 16/35 R |
| 6,219,881 B1 * | 4/2001 | Wen | B60B 33/0018 |
| | | | 16/35 R |
| 6,357,077 B1 * | 3/2002 | Jones, Jr. | B60B 33/045 |
| | | | 16/35 D |
| 6,539,578 B1 | 4/2003 | Guttmann et al. | |
| 6,568,030 B1 * | 5/2003 | Watanabe | B60B 33/045 |
| | | | 16/19 |
| 6,769,701 B1 * | 8/2004 | Clausen | A45C 5/14 |
| | | | 16/44 |
| 6,789,810 B2 * | 9/2004 | Strong | B60B 33/045 |
| | | | 16/18 R |
| 6,854,567 B2 * | 2/2005 | Suzuki | B60B 33/0007 |
| | | | 16/35 R |
| 6,964,083 B2 * | 11/2005 | Nagai | B60B 1/006 |
| | | | 16/35 R |
| 7,497,449 B2 * | 3/2009 | Logger | B60B 33/045 |
| | | | 16/19 |
| 7,546,908 B2 * | 6/2009 | Chang | A45C 5/145 |
| | | | 16/35 R |
| 7,648,150 B2 * | 1/2010 | Chen | B60B 33/045 |
| | | | 16/35 R |
| 7,657,968 B2 * | 2/2010 | Levin | B60B 33/045 |
| | | | 16/44 |
| 7,698,780 B2 * | 4/2010 | Yan | B60B 33/0021 |
| | | | 16/18 CG |
| 8,046,871 B2 * | 11/2011 | Yamauchi | B60B 33/0007 |
| | | | 16/45 |
| 8,087,126 B2 * | 1/2012 | Duvert | A47D 7/00 |
| | | | 16/18 CG |
| 8,220,110 B1 * | 7/2012 | Chen | B60B 33/0007 |
| | | | 16/35 R |
| 8,607,414 B1 | 12/2013 | Kinsela | |
| 9,038,785 B2 * | 5/2015 | Lin | B60B 33/021 |
| | | | 16/35 R |
| 9,074,420 B2 * | 7/2015 | Goodman | E05D 15/0665 |
| 9,090,125 B2 * | 7/2015 | Block | B60B 33/0039 |
| 9,108,665 B2 * | 8/2015 | Amino | B62D 5/0418 |
| 9,327,553 B2 * | 5/2016 | Woodrum | B60B 33/045 |
| 9,593,003 B2 * | 3/2017 | Goncalves | B62B 5/00 |
| 2006/0117524 A1 * | 6/2006 | Yan | B60B 33/045 |
| | | | 16/44 |
| 2006/0288526 A1 * | 12/2006 | Larson | B60B 33/045 |
| | | | 16/44 |
| 2007/0056140 A1 * | 3/2007 | Yamauchi | B60B 33/0007 |
| | | | 16/18 B |
| 2007/0143957 A1 * | 6/2007 | Baek | B60B 33/045 |
| | | | 16/44 |
| 2008/0238016 A1 * | 10/2008 | Chen | B60B 33/045 |
| | | | 280/124.145 |
| 2009/0019670 A1 * | 1/2009 | Tsai | B60B 33/0007 |
| | | | 16/35 R |
| 2010/0162520 A1 * | 7/2010 | Yamauchi | B60B 33/0007 |
| | | | 16/45 |
| 2011/0227304 A1 * | 9/2011 | Lai | B60B 33/0015 |
| | | | 280/81.6 |
| 2013/0212834 A1 * | 8/2013 | Chen | B60B 33/0018 |
| | | | 16/45 |
| 2015/0174957 A1 * | 6/2015 | Brazier | B60B 33/045 |
| | | | 16/45 |
| 2015/0274495 A1 * | 10/2015 | Goncalves | B66F 9/07586 |
| | | | 254/2 R |
| 2015/0306908 A1 | 10/2015 | Sharratt et al. | |
| 2015/0367695 A1 * | 12/2015 | Woodrum | B60B 33/045 |
| | | | 280/124.114 |
| 2016/0340162 A1 * | 11/2016 | Standard | B62B 5/00 |
| 2017/0106696 A1 * | 4/2017 | Schulte | A47C 17/86 |

* cited by examiner

SUSPENSION CASTER WITH BRAKE LEVER AND WHEEL FORK AND YOKE PORTION HAVING COMMON PIVOT AXIS

BACKGROUND

This disclosure relates to a suspension caster. More in particular, the disclosure relates to suspension caster having a yoke portion connected to a wheel fork assembly to pivot about a pivot axis. More in particular, the disclosure relates to a brake lever assembly for the caster where the brake lever pivots about the same axis as the pivot axis of the yoke portion and wheel forks.

DETAILED DESCRIPTION

Figure 1:
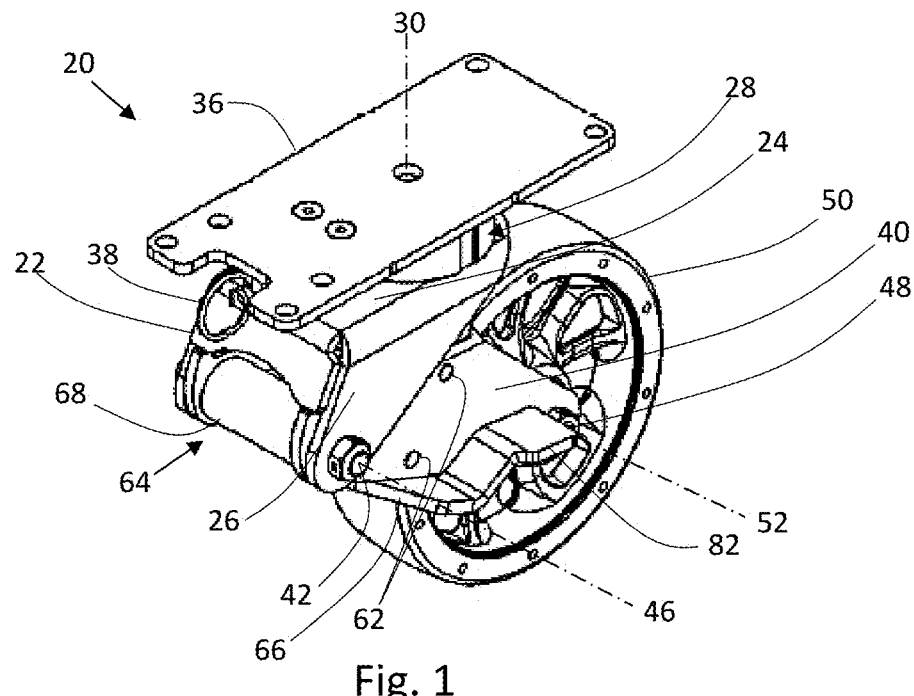
FIG. 1 is a perspective view of an exemplary suspension caster.
Figure 2:
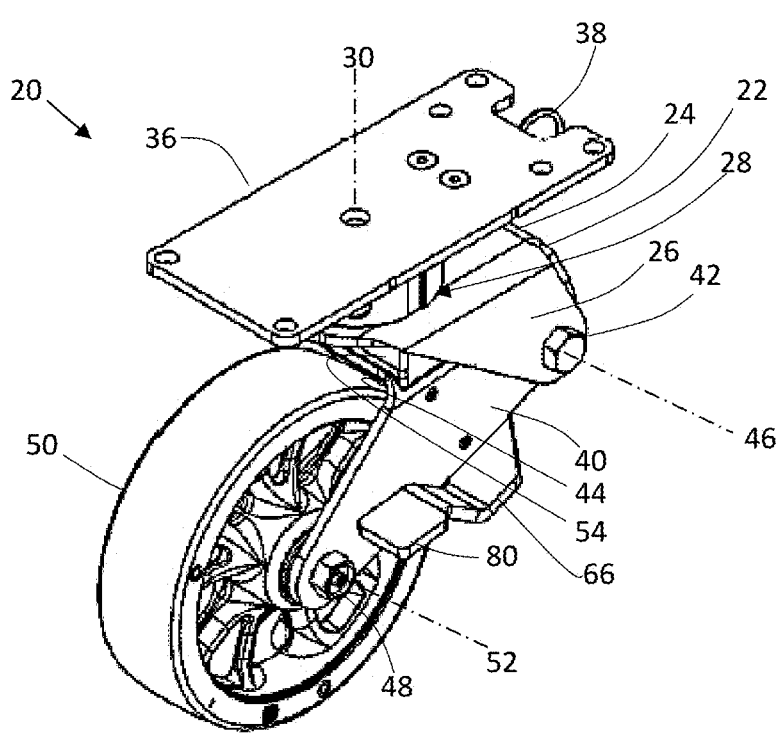
FIG. 2 is an alternate perspective view of the caster of FIG. 1.
Figure 3:
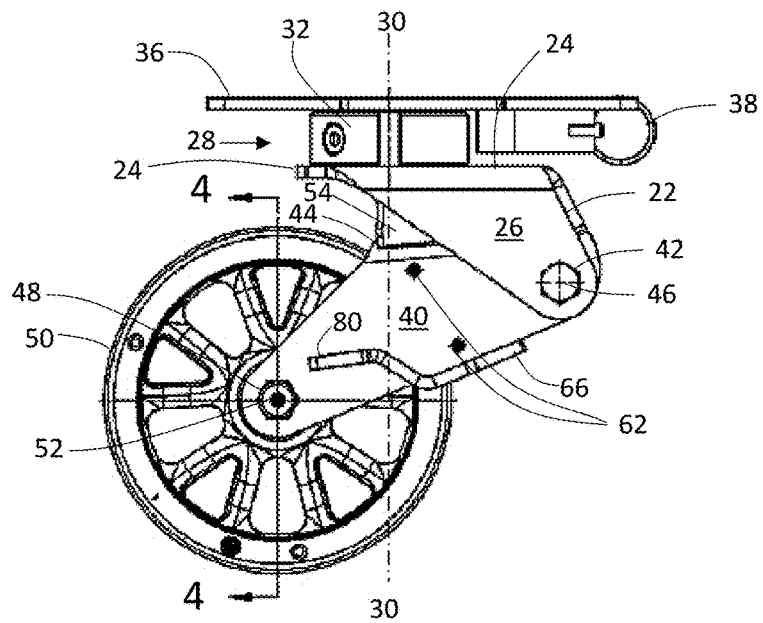
FIG. 3 is a front elevational view of the caster of FIG. 1, the rear view being a mirror image thereof.

The exemplary caster 20 has a yoke portion 22 that is adapted and configured to be operatively attached to an object. As shown in the drawings, the yoke portion 22 may include a support surface 24 with bifurcations 26 depending therefrom. The yoke portion 22 of the caster may include a swivel feature 28 allowing the caster to rotate about a swivel axis 30 (e.g., a vertical axis in the drawings). The swivel feature 28 may be mounted to the support surface 24, and may include a housing 32, a stem 34, and/or a top weldment plate 36. As shown in the drawings, the top weldment plate 36 may allow for direct mounting of the caster to an object. The top weldment plate 36 may be connected directly to the object with mechanical fasteners, welding, or other mechanical means. In the alternative, the top weldment plate may be eliminated and the caster may be mounted to an object via the stem or an extension of the stem. The housing 32 may include bearings in which the stem 34 is rotatably disposed. The stem 34 may extend from the top weldment plate 36 (downward in the drawings; see FIG. 8) into the housing 32 mounted on the support surface 24, thereby allowing the stem and the top weldment plate to rotate together about a vertical axis relative to the housing. The opposite configuration may also be used with the housing extending from the top weldment plate (downward in the drawings) and the stem extending from the support surface into the housing. A lock 38 may be provided on the top weldment plate 36 to lock the housing 32 with the top weldment plate and prevent rotation of the top weldment plate relative to the housing about the swivel axis 30.

The caster may have wheel forks 40 connected to the yoke portion 22 at a pivot connection 42. The pivot connection 42 may be provided at a distal end of the yoke portion bifurcations 26. The pivot connection 42 may be a mechanical fastener or an axle configured to prevent unintended removal of the axle from the pivot connection. The wheel forks 40 may extend at an acute angle, and generally downward and away from the pivot connection 42. A gusset 44 may extend across a portion of the tops of the wheel forks 40 to provide additional structural integrity for the caster. The wheel forks 40 may be disposed within the bifurcations 26 of the yoke portion with the mechanical fastener coupling the two together and defining a pivot axis 46 of the pivot connection 42. As shown in the drawings, the yoke portion support surface 24 and wheel forks gusset 44 are generally opposed within the intended operating range of the caster. At a distal end of the wheel forks 40, an axle 48 may be provided for rotatably mounting a caster wheel 50 to the wheel forks. The axle 48 may define a wheel axis 52. The wheel axis 52 and pivot axis 46 may be parallel, and the wheel axis and the pivot axis may be generally perpendicular to the swivel axis 30 with the swivel axis spatially between vertical reference lines through the centers of the wheel axis and the pivot axis. While the drawings show two wheel forks (e.g., a bifurcated arrangement), the caster may have one wheel fork.

To maintain the yoke portion 22 and wheel forks 40 pivotally spaced apart at a desired range of angles, a biasing member 54 may be disposed between the yoke portion and wheel forks. As shown in the drawings, the biasing member 54 is disposed on an included angle side of the pivot connection 42 between the yoke portion support surface 24 and the wheel forks gusset 44. The biasing member 54 may be a resilient, compressible material disposed between the yoke portion 22 and wheel forks 40. The biasing member may also include a coil spring. The biasing member 54 may compress as a load is applied to the caster, and may provide shock absorption and vibration dampening as the wheel 50 traverses across a surface. As the load on the caster changes, the biasing member 54 may compress more or less, allowing the wheel axis to move vertically upward and downward, as applicable, within an intended operating range of the caster.

Figure 8:
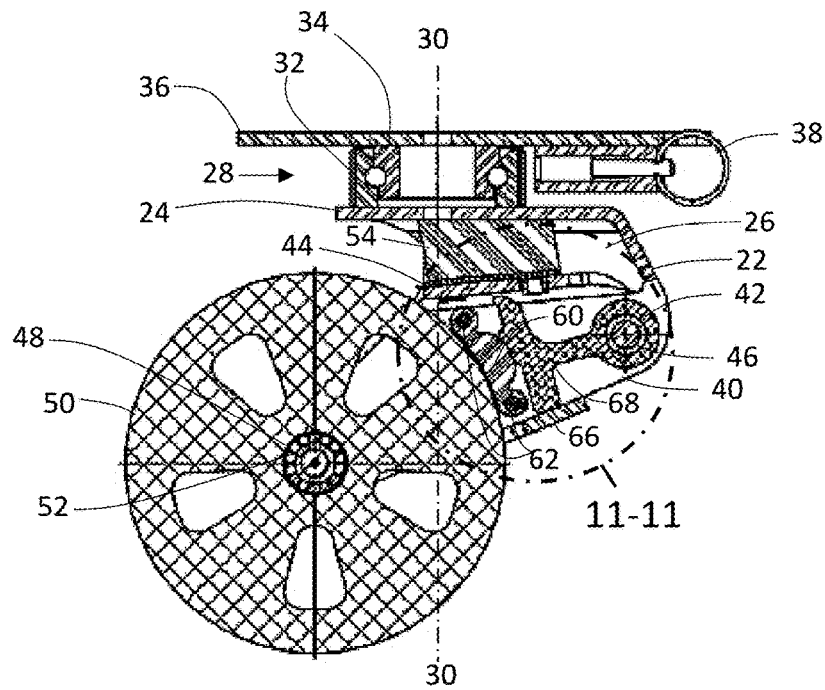
FIG. 8 is a cross-sectional view taken along lines 8-8 of FIG. 5.
Figure 9:
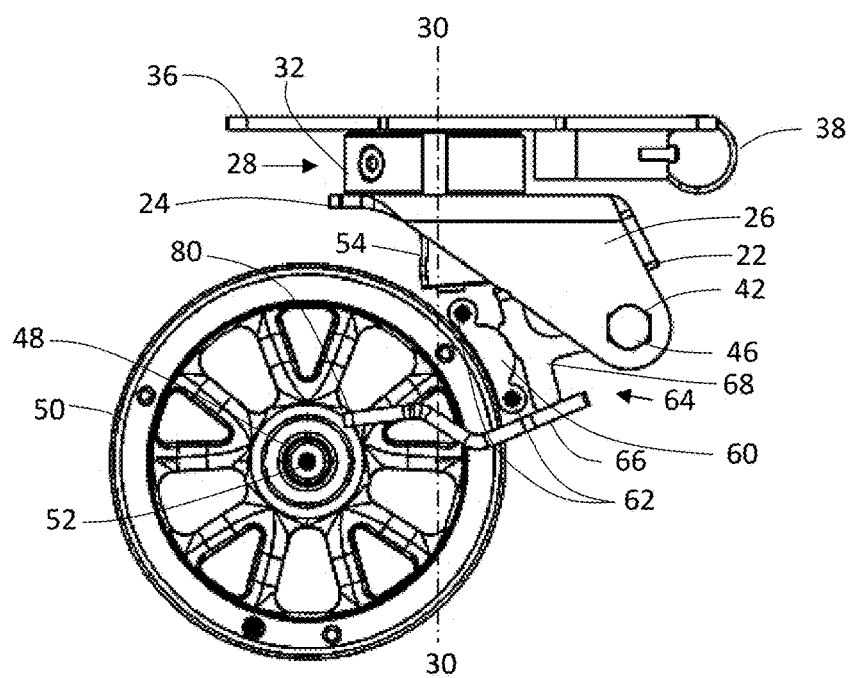
FIG. 9 is a partial front elevational view of the caster of FIG. 1 with the wheel forks removed to show additional detail of a brake lever actuator of the caster.
Figure 10:
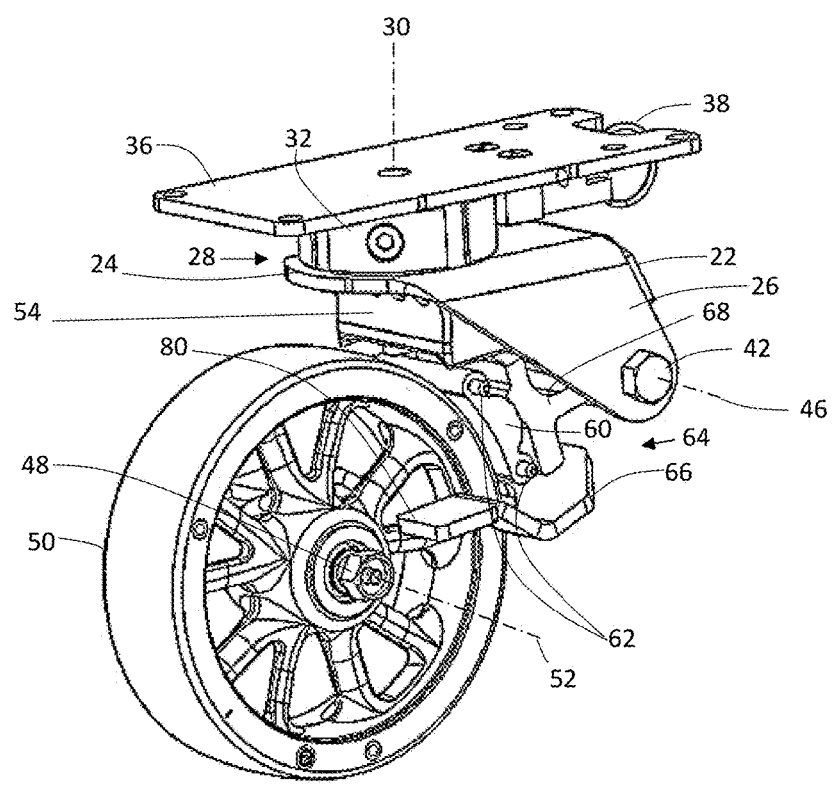
FIG. 10 is a partial perspective view of the caster of FIG. 1 with the wheel forks removed to show additional detail of the brake lever actuator.
Figure 11:
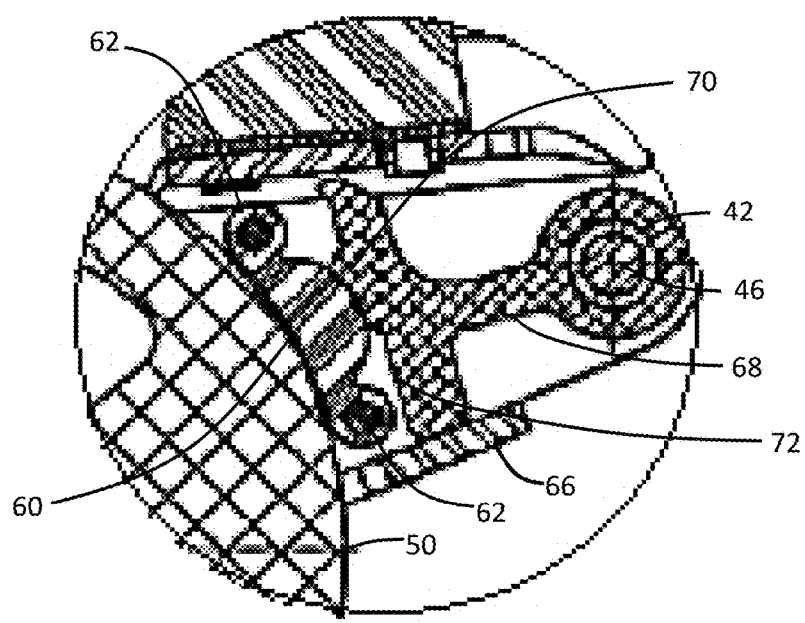
FIG. 11 is an enlarged, partial, cross-sectional view from detail area 11-11 of FIG. 8.

The caster 20 includes a brake pad 60 movable between an engaged position in which the pad may be pressed against the caster wheel 50 to frictionally engage the caster wheel and prevent rotation of the caster wheel about the wheel axis 52, and a disengaged position in which the brake pad may be released from engagement with the wheel so as to enable the wheel to freely rotate about the wheel axis. The brake pad 60 may be configured to engage an outer diameter surface of the caster wheel 50 in the engaged position. The brake pad 60 may be formed from a resilient material. For instance, the brake pad 60 may be formed from a high grip, thermoplastic rubber material. The brake pad 60 may be removably connected to at least one of the wheel forks 40. As best shown in FIG. 8, the brake pad 60 is removably mounted to an inside wall surface of the wheel forks 40. The brake pad 60 may be removably mounted to both wheel forks 40 on opposite ends of the brake pad. For instance, mechanical fasteners 62 may be directed through the wheel forks 40 and through opposite ends of the brake pad 60 in removably mounting the brake pad between the bifurcations of the wheel forks. By providing a brake pad 60 which is releasably mounted to the wheel forks, the brake pad may be easily replaced when worn and may be retrofitted or changed out depending upon the wheel diameters used for the caster. For instance, a brake pad which cooperates with a specific wheel diameter may be installed as needed in a manner which increases operational and manufacturing flexibility of the caster. As will be explained in greater detail below, a center of the brake pad 60 may be pressed against the wheel 50 in the engaged position to frictionally engage the outer diameter surface of the wheel. As the brake pad may be formed from a resilient material, the brake pad 60 may spring return to the disengaged position to release from the wheel.

Figures 4, 5:
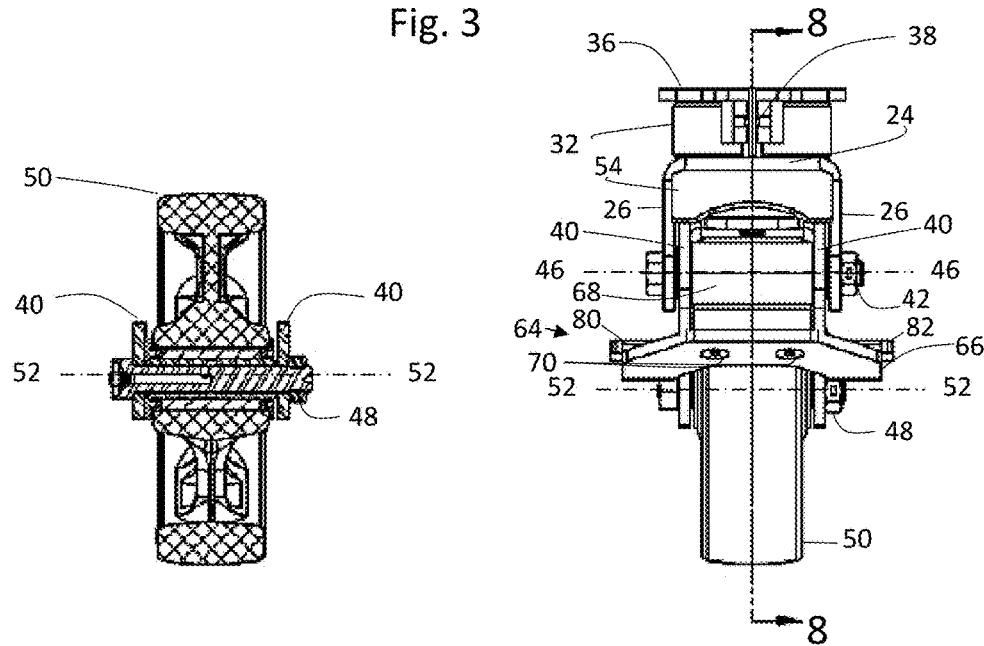
FIG. 4 is a cross-sectional view taken along lines 4-4 of FIG. 3.
FIG. 5 is a right side view of the caster of FIG. 3.
Figure 6:
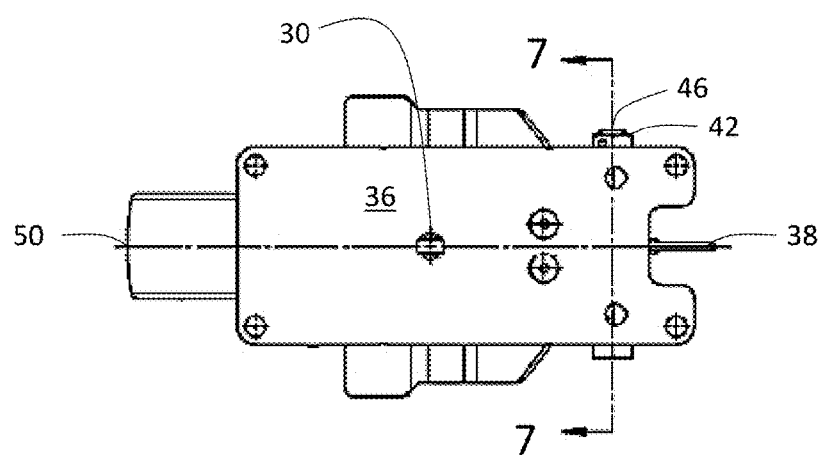
FIG. 6 is a top view of the caster of FIG. 3.
Figure 7:
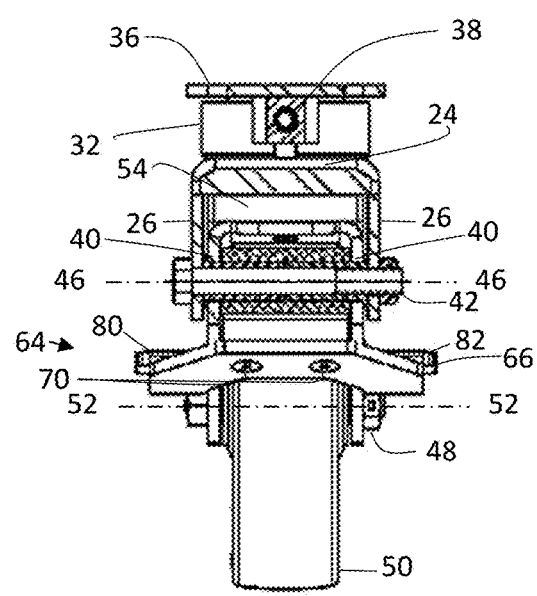
FIG. 7 is a cross-sectional view taken along lines 7-7 of FIG. 6.

The caster includes a brake lever assembly 64 with a brake lever 66 configured to pivot about the pivot axis 46. The brake lever 66 may be operatively connected to the pivot connection 42 of the yoke portion 22 and the wheel forks 40. In the alternative, the brake lever 66 may be operatively connected to a brake lever pivot (not shown) which may be a separate pivot connection different from the pivot connection 42 of the wheel forks and the yoke portion. In this alternative configuration, the brake lever pivot may be coaxially aligned with the pivot connection of the wheel forks and the yoke portion such that the brake lever pivots about the same pivot axis as the yoke portion and wheel forks. In this way, the brake lever pivot and pivot connection of the wheel forks and yoke portion is coaxially aligned. The brake lever assembly 64 may also include a cam 68. The cam 68 may be operatively connected to the brake lever 66. The cam 68 may be directly connected to the pivot connection 42, or the brake lever pivot (not shown) depending upon the configuration. The cam 68 may rotate about the pivot axis 46 upon rotation of the brake lever 66. The brake lever 66 and the cam 68 may rotate together and pivot about the pivot axis 46 as a unitary member. As shown in the drawings, the brake lever 66 and the cam 68 are integral. For instance, the brake lever 66 may be mechanically connected to the cam 68, for instance, using mechanical fasteners 70, as shown in FIGS. 5 and 7. In the alternative, the brake lever may be directly connected to the pivot connection or the brake lever pivot, depending upon the configuration, with the cam mechanically connected to the brake lever. Although the drawings show the brake lever and cam as a unitary member configured to pivot about the pivot axis, the brake lever may be cooperatively connected with the cam through another linkage such that movement of the brake lever affects motion of the cam between the engaged and disengaged position, although the cam and brake lever are not directly coupled to each other.

The brake lever 66 and the cam 68 cooperate to move the brake pad 60 between the engaged and the disengaged positions. When the brake lever 66 is pivoted, the cam 68 may move the brake pad 60 to the engaged position against the caster wheel. When release of the brake pad 60 is desired, the brake lever 66 may be operated in a manner to move the cam 68 to a position where the cam is spaced away from the brake pad. Because the brake pad 60 may be resilient, the brake pad may spring return to a position where it is no longer in engagement with the outer diameter surface of the wheel 50. The cam 68 may have a driving surface, a portion of which is convex 70 and a portion of which is concave 72 or formed with detents. To move the brake pad 60 from the disengaged position to the engaged position, the convex portion 70 of the cam driving surface may force the brake pad into engagement with the wheel 50. To move the brake pad 60 from the engaged position to the disengaged position, the cam 68 may be moved to a position where the concave portion 72 or the detents of the cam driving surface are aligned with the brake pad, thereby enabling the brake pad to spring away and release from the wheel 50 without interference from the cam.

The brake lever 66 may have an arm 80 that extends away from the pivot connection 42 toward the wheel axis 52 and laterally outboard of the wheel fork 40. A distal end of the brake lever arm 80 may serve as the actuation point of the brake lever 66. The brake lever 66 may comprise a second arm 82 that extends away from the pivot connection 42 toward the wheel axis 52 and laterally outboard of the opposite wheel fork 40. A distal end of the second arm 82 of the brake lever may also serve as an actuation point of the brake lever. The brake lever first and second arms 80,82 on opposite outboard sides of the wheel forks 40 enables the brake lever 66 to be actuated with the wheel 50 of the caster aligned in any direction using any side. By arranging the actuation point of the brake lever 66 at a distance from the pivot connection 42, additional mechanical advantage (e.g., lever arm distance) may be achieved to drive the brake pad 60 into engagement with the wheel 50. Additionally, by providing the actuation point of the brake lever 66 outboard of the wheel forks 40 and extending towards the wheel axis 52, and the arms 80 of the brake lever laterally outboard of the wheel forks, a compact design for the caster may be achieved, as opposed to providing the arms of the brake lever pointing away from the wheel axis on the opposite side of the pivot connection and not laterally outboard of the wheel forks, which would extend the longitudinal profile of the caster.

By providing a single pivot connection 42 for the yoke portion 22 and the wheel forks 40, and the brake lever assembly 64, the manufacturing and assembly of the caster may be simplified. Further, the common pivot axis 46 of the yoke portion 22 and the wheel forks 40, and the brake lever assembly 64, enables a more uniform braking force to be applied to the caster regardless of the loading of the caster and the position of the wheel 50 relative to the yoke portion 22 and wheel forks 40. Additionally, by changing the characteristics (e.g., the resiliency, spring force) of the biasing member 54, the suspension characteristics of the caster 20 may be tuned for a particular application and intended loading. Further, the arrangement of the brake pad 60 relative to the wheel forks 40 provides more stable braking function when there is a change in loading of the caster. Any changes in wheel diameter may be accommodated by changing the brake pad 60 and/or the mounting position of the brake pad relative to the wheel forks 40. This allows the same wheel forks 40 and yoke portion 22 to be used for a variety of wheel diameters.

The embodiments were chosen and described in order to best explain the principles of the disclosure and its practical application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A caster comprising:
   a yoke portion being adapted and configured to be operatively attached to an object;
   a wheel fork pivotally connected to the yoke portion at a pivot connection, the pivot connection defining a pivot axis;
   a wheel rotatably connected to the wheel fork at a wheel axis;
   a brake lever operatively connected to the pivot connection and adapted and configured to pivot about the pivot axis with a cam operatively connected to the brake lever;
   a brake pad non-rotatably mounted to the wheel fork via at least one mechanical fastener;
   wherein the cam of the brake lever moves the brake pad between an engaged position and a disengaged position as the brake lever is pivoted about the pivot axis, wherein in the engaged position, the brake pad is pressed against the wheel by engagement with the cam, and wherein in the disengaged position, the cam is spaced apart from the brake pad in a manner such that the brake pad releases from the wheel.

2. The caster of claim 1 wherein the brake pad is releasably mounted to the wheel fork for adjustment and replacement.

3. The caster of claim 2 wherein the brake pad is resilient.

4. The caster of claim 1 wherein the cam is pivotally connected to the pivot connection and the brake lever is mounted to the cam.

5. A caster comprising:
   a yoke portion being adapted and configured to be operatively attached to an object;
   wheel forks pivotally connected to the yoke portion at a pivot connection, the pivot connection defining a pivot axis;
   a wheel rotatably connected to the wheel forks at a wheel axis;
   a brake lever operatively connected to the pivot connection and adapted and configured to pivot about the pivot axis with a cam operatively connected to the brake lever;
   a brake pad disposed between the wheel forks, the brake pad non-rotatably mounted to the wheel forks via at least one mechanical fastener;
   wherein the cam moves the brake pad between an engaged position wherein the brake pad is pressed against the wheel to limit rotation of the wheel about the wheel axis and a disengaged position wherein the brake pad is spaced away from the wheel to allow rotation of the wheel about the wheel axis, the brake pad being moved to the engaged position by engagement with the cam and the disengaged position by the cam being spaced apart from the brake pad.

6. The caster of claim 5 wherein the brake pad is releasably mounted to at least one of the wheel forks for adjustment and replacement.

7. The caster of claim 5 wherein the cam is pivotally connected to the pivot connection and the brake lever is mounted to the cam.

8. The caster of claim 5 wherein the cam is disposed between the wheel forks.

9. The caster of claim 5 wherein the wheel forks are disposed between bifurcations of the yoke portion.

10. The caster of claim 5 wherein the brake lever has an actuator portion outboard of the wheel forks.

11. The caster of claim 5 wherein the brake lever has an actuator portion extending toward the wheel axis.

12. A caster comprising:
    a yoke portion being adapted and configured to be operatively attached to an object;
    wheel forks pivotally connected to the yoke portion at a pivot connection, the pivot connection defining a pivot axis;
    a wheel rotatably connected to the wheel forks at a wheel axis;
    a brake lever having a brake lever pivot axis coaxial with the pivot axis of the pivot connection of the yoke portion and wheel forks, the brake lever being adapted and configured to pivot about the brake lever pivot axis;
    a cam operatively connected to brake lever and movable together with the brake lever to pivot about the brake lever pivot axis;
    a brake pad non-rotatably mounted to the wheel forks via at least one mechanical fastener;
    wherein the brake pad is movable between an engaged position and a disengaged position, wherein in moving from the disengaged position to the engaged position, the cam engages the brake pad to move the brake pad into engagement against the wheel to limit rotation of the wheel about the wheel axis, and wherein in moving from the engaged position to the disengaged position, the cam is spaced apart from the brake pad to move to a position where the brake pad is spaced away from the wheel to allow rotation of the wheel about the wheel axis.

13. The caster of claim 12 wherein the brake pad is releasably mounted to at least one of the wheel forks for adjustment and replacement.

14. The caster of claim 12 wherein the brake lever is operatively connected to the pivot connection of the yoke portion and wheel forks.

15. The caster of claim 14 wherein the cam is pivotally connected to the pivot connection.

16. The caster of claim 15 wherein the brake lever is mounted to the cam.

17. The caster of claim 12 wherein the brake lever has an actuator portion extending toward the wheel axis.

18. The caster of claim 12 wherein the brake lever has an actuator portion outboard of the wheel forks.

* * * * *